March 11, 1952    E. J. VANI    2,589,000
BUTTER SPREADER
Filed Oct. 26, 1950
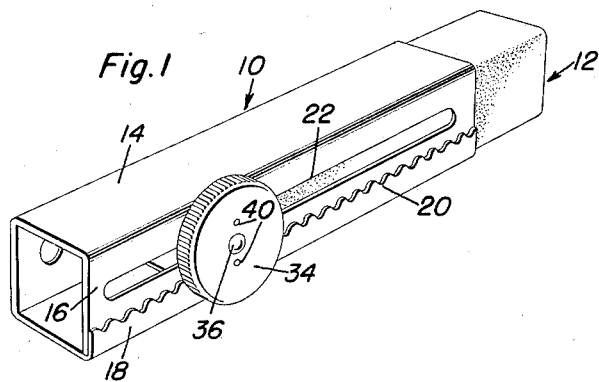
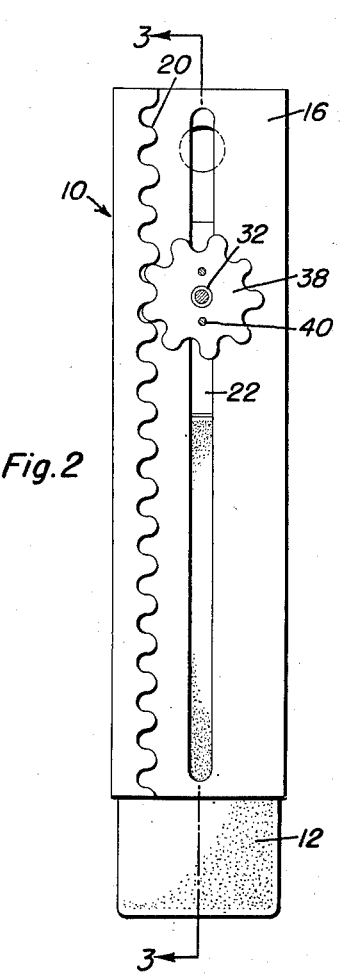
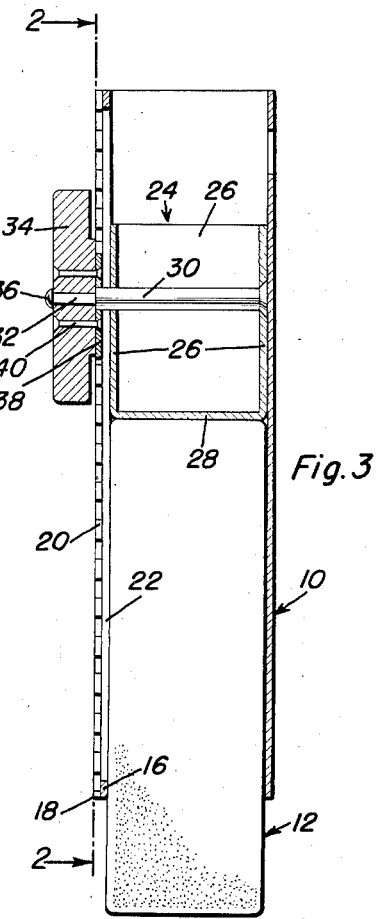
Eugene J. Vani INVENTOR.

Patented Mar. 11, 1952

2,589,000

UNITED STATES PATENT OFFICE 2,589,000

BUTTER SPREADER

Eugene J. Vani, Benwood, W. Va.

Application October 26, 1950, Serial No. 192,201

1 Claim. (Cl. 206—56)

This invention comprises novel and useful improvements in a butter spreader and more specifically pertains to a kitchen utensil for receiving and concealing a stick of butter or the like therein and for controllably feeding or dispensing the stick from an open end of the device.

The primary object of this invention is to provide a dispensing device for butter and similar materials for hygienically housing and retaining the stick of butter or the like and controllably extending a portion of the stick beyond the end of the device for dispensing or spreading the same.

A still further object of the device is to provide a butter spreader as set forth in the foregoing objects which shall be of extremely compact size, light weight and inexpensive construction, yet very durable and efficient in use, and which shall be capable of very accurately dispensing portions of a stick of butter or the like from the device for use.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a perspective view showing one embodiment of butter spreader incorporating therein the principle of this invention, a portion of the end of a stick of butter being shown extruded from the end of the device;

Figure 2 is a side elevational view of the device shown in Figure 1, this view being taken in elevation substantially upon the vertical plane indicated by the section line 2—2 of Figure 3; and Figure 3 is a vertical central longitudinal sectional view, taken substantially upon the plane indicated by the section line 3—3 of Figure 2.

It is the primary and essential purpose and aim of this invention to provide a very simple, light weight and inexpensive construction of a kitchen utensil which shall hygienically receive a stick of butter such as a quarter pound stick of conventional configuration, and shall selectively extrude the end of the stick from the end of the container to facilitate the spreading of butter even when cold upon toast or the like; and in fact to dispense any other desired article of food in a similar manner.

Referring now more specifically to the accompanying drawings, wherein like numerals designate similar parts throughout the various views, it will be apparent that the device indicated generally by the numeral 10 is employed to receive and dispense stick-like articles, such as a stick of butter indicated generally at 12. As will be apparent from the several views of the drawings, the device 10 comprises a hollow body having generally rectangular sides, this body being formed of a unitary sheet of sheet metal or other similar material which is folded upon itself to provide a hollow body which is open at its ends and is of substantially square cross-section, this body being denoted by the numeral 14.

When folded upon itself, one of the sides such as that indicated at 16 is overlapped by another end portion of the body as at 18, and this overlapped portion may be disposed either on the interior or exterior of the body as desired, the construction shown conveniently placing the portion 18 on the exterior. When so folded, the adjacent end portions of the body are secured rigid to each other in any desired manner such as by welding or the like so as to provide a substantially firm and rigid but light weight construction.

As will be best seen from Figure 1, the edge of the end portion 18 is serrated or provided with saw teeth or the like 20 and constitutes a rack for a purpose which will be later set forth. Disposed longitudinally of the sides 16 and closely adjacent the rack teeth 20 there is provided a longitudinally extending slot 22.

Referring next more particularly to Figure 3, it will be seen that a follower indicated generally by the numeral 24 is slidably received in the hollow body 14 and is movable longitudinally of the same. This follower is preferably in the shape of a cube or the like, having a plurality of side walls 26 and either one or two end walls 28 at its opposite ends. As shown, one end wall 28 is provided, although it will be understood that if desired a similar end wall can be provided at the end of the cube.

The follower 24 is slidable within the hollow body 14 and thus serves to press the stick of butter or the like 12 from an open end of the body in order to dispense the same.

In order to controllably manipulate the follower 24, there is provided an axle 30 which extends through the sides 26 of the follower and is secured thereto. This axle may be journaled rotatably in the sides of the body, if desired, but it is preferred to rigidly attach the axle to the body in a non-rotatable manner as by spot-welding or the like, the end of this axle extending through the above-mentioned longitudinal slot 22. At its outer end, the axle is provided with a diametrically reduced axial extension 32 upon which is rotatably mounted a knob 34. The end of the diametrically reduced axial portion 32 may be headed over as at 36 in the same manner as a rivet head to retain the knob portion 34 thereon. Fixedly secured to the knob 34 and upon the side of the same which is adjacent to the body 14, is a gear or pinion wheel 38 which is secured to the knob as by rivets or pins 40. This pinion wheel which is thus fixedly secured to the knob 34 is adapted to at all times operatively engage the rack teeth 20 whereby upon rotation of the knob manually, the teeth and, therefore, the axle and follower will move longitudinally of the body to perform the above mentioned dispensing operation of the stick of butter.

It will, of course, be apparent that the slot 22 serves to guide to some extent the follower and sliding movement and to prevent withdrawal of the follower from the ends of the body.

It will be further apparent that the rack teeth 20 on the portion 18 may, at will, be disposed either on the exterior or interior of the walls 16 of the hollow body, with the rack pinion 38 being appropriately positioned for engagement therewith.

Obviously, by providing the follower 24 with two end walls 28, the device can be employed to dispense sticks of butter or the like from either end of the hollow body, and in some instances by positioning the follower between portions of two such sticks, either stick of butter or other material may be selectively dispensed.

From the foregoing, the construction and operation of the device will be readily understood and further explanation is believed to be unnecessary.

However, since numerous modifications and changes will readily occur to those skilled in the art, it is not desired to limit the invention to the exact construction shown and described, and accordingly all suitable modifications and equivalents may be resorted to, falling within the scope of the appended claim.

Having described the invention, what is claimed as new is:

A butter spreader comprising an elongated tubular body open at its ends for receiving a stick of butter, a follower slidable within said body for forcibly ejecting a stick of butter from an open end of said body, means operable exteriorly of said body for controllably moving said follower longitudinally of said body, said body having a longitudinal slot in one side, an axle journaled in said follower and extending through said slot, a pinion on said axle, a rack on said body engaging said pinion, a knob on said axle for rotating said axle and pinion, said body comprising a unitary sheet metal member folded upon itself, one edge of said member overlapping the other, the overlapping edge having saw teeth thereon comprising said rack.

EUGENE J. VANI.

REFERENCES CITED

The following references are of record in the file of this patent:

UNITED STATES PATENTS

| Number | Name | Date |
| --- | --- | --- |
| 1,712,840 | Povel | May 14, 1929 |
| 1,983,083 | Irelan | Dec. 4, 1934 |
| 2,529,037 | Marples | Nov. 7, 1950 |